United States Patent
To et al.

(10) Patent No.: US 9,934,278 B2
(45) Date of Patent: Apr. 3, 2018

(54) METHOD OF OPTIMIZING COMPLEX SQL STATEMENTS USING A REGION DIVIDED PREFERENTIAL SQL REWRITE OPERATION

(71) Applicant: QUEST SOFTWARE INC., Aliso Viejo, CA (US)

(72) Inventors: Wai Yip To, Yaumatei (HK); Ka Wing Luk, Tseung Kwan O (HK)

(73) Assignee: QUEST SOFTWARE INC., Aliso Viejo, CA (US)

( * ) Notice: Subject to any disclaimer, the term of this patent is extended or adjusted under 35 U.S.C. 154(b) by 319 days.

(21) Appl. No.: 14/702,858

(22) Filed: May 4, 2015

(65) Prior Publication Data

US 2016/0328446 A1    Nov. 10, 2016

(51) Int. Cl.
G06F 17/30    (2006.01)

(52) U.S. Cl.
CPC .. G06F 17/30474 (2013.01); G06F 17/30404 (2013.01)

(58) Field of Classification Search
None
See application file for complete search history.

(56) References Cited

U.S. PATENT DOCUMENTS

| | | | | |
|---|---|---|---|---|
| 6,061,676 A * | 5/2000 | Srivastava | ........ | G06F 17/30454 707/694 |
| 2006/0106766 A1* | 5/2006 | Bloom | .............. | G06F 17/30463 |
| 2007/0150279 A1* | 6/2007 | Gandhi | .................... | G10L 13/08 704/258 |
| 2008/0147596 A1* | 6/2008 | McKenna | ......... | G06F 17/30451 |
| 2008/0288473 A1* | 11/2008 | Hu | .................... | G06F 17/30522 |
| 2008/0306904 A1* | 12/2008 | Fukuda | ............. | G06F 17/30557 |
| 2009/0077016 A1* | 3/2009 | Belknap | ............ | G06F 17/30306 |
| 2010/0287214 A1* | 11/2010 | Narasayya | ........ | G06F 17/30306 707/805 |
| 2011/0131199 A1* | 6/2011 | Simon | ............... | G06F 17/30463 707/714 |
| 2011/0295854 A1* | 12/2011 | Chiticariu | ......... | G06F 17/30616 707/737 |

(Continued)

*Primary Examiner* — Wilson Lee
(74) *Attorney, Agent, or Firm* — Maschoff Brennan

(57) ABSTRACT

A system, method, and computer-readable medium for optimizing complex SQL statements using a region divided preferential SQL rewrite operation. The region divided preferential SQL rewrite operation makes it possible for a user to inference a machine SQL statement rewrite operation to optimize the SQL statement with more or less focus on different regions of the SQL. This operation combines the strength of using heuristic knowledge and understanding of data to rewrite the region of the SQL statement where the problem originates with the precision and efficiency of a machine SQL statement rewrite operation. More specifically, optimizing a complex SQL statement includes a region division operation during which a SQL statement is divided into multiple regions, a user preference assignment process in which the user defines different attention level for different regions, and a region preferential rewrite operation in which the SQL statement is rewritten with consideration to the attention level defined for each region of the SQL statement.

18 Claims, 4 Drawing Sheets

(56) References Cited

U.S. PATENT DOCUMENTS

| | | | |
|---|---|---|---|
| 2013/0006964 A1* | 1/2013 | Hammerschmidt | G06F 17/30929 707/718 |
| 2015/0066910 A1* | 3/2015 | Bleach .............. | G06F 17/30451 707/722 |
| 2015/0149436 A1* | 5/2015 | McKenna ......... | G06F 17/30442 707/714 |

* cited by examiner

```
SELECT EMP_NAME,DPT_NAME,GRD_DESC
  FROM EMPLOYEE,
       DEPARTMENT DEPARTMENT1,
       GRADE
 WHERE EMP_GRADE = GRD_ID
   AND EMP_DEPT = DPT_ID
   AND EXISTS (SELECT 'X'
                 FROM DEPARTMENT DEPARTMENT2
                WHERE DPT_AVG_SALARY > (SELECT MIN(DPT_AVG_SALARY)
                                         FROM DEPARTMENT DEPARTMENT3)
                  AND DPT_ID = EMPLOYEE.EMP_DEPT)
UNION
SELECT EMP_NAME,DPT_NAME,GRD_DESC
  FROM EMPLOYEE_TEMP,
       DEPARTMENT DEPARTMENT1,
       GRADE
 WHERE EMP_GRADE = GRD_ID
   AND EMP_DEPT = DPT_ID
   AND EXISTS (SELECT 'X'
                 FROM DEPARTMENT DEPARTMENT2
                WHERE DPT_AVG_SALARY >= any (SELECT AVG(DPT_AVG_SALARY)
                                               FROM DEPARTMENT DEPARTMENT3
                                              WHERE DPT_STATUS is not null
                                              UNION
                                              SELECT DPT_MAX_SALARY
                                                FROM DEPARTMENT
                                               WHERE DPT_STATUS is null)
                  AND DPT_ID = EMPLOYEE_TEMP.EMP_DEPT)
```

```
SELECT EMP_NAME,DPT_NAME,GRD_DESC
  FROM EMPLOYEE,
       DEPARTMENT DEPARTMENT1,
       GRADE
 WHERE EMP_GRADE = GRD_ID
   AND EMP_DEPT = DPT_ID
   AND EXISTS ( SELECT 'X'
                  FROM DEPARTMENT DEPARTMENT2
                 WHERE DPT_AVG_SALARY > (SELECT MIN(DPT_AVG_SALARY)
                                          FROM DEPARTMENT DEPARTMENT3)
                   AND DPT_ID = EMPLOYEE.EMP_DEPT )
UNION
SELECT EMP_NAME,DPT_NAME,GRD_DESC
  FROM EMPLOYEE_TEMP,
       DEPARTMENT DEPARTMENT1,
       GRADE
 WHERE EMP_GRADE = GRD_ID
   AND EMP_DEPT = DPT_ID
   AND EXISTS ( SELECT 'X'
                  FROM DEPARTMENT DEPARTMENT2
                 WHERE DPT_AVG_SALARY >= any (SELECT AVG(DPT_AVG_SALARY)
                                               FROM DEPARTMENT DEPARTMENT3
                                              WHERE DPT_STATUS is not null
                                              UNION
                                              SELECT DPT_MAX_SALARY
                                                FROM DEPARTMENT
                                               WHERE DPT_STATUS is null )
                   AND DPT_ID = EMPLOYEE_TEMP.EMP_DEPT )
```

*Figure 2B*

METHOD OF OPTIMIZING COMPLEX SQL STATEMENTS USING A REGION DIVIDED PREFERENTIAL SQL REWRITE OPERATION

BACKGROUND OF THE INVENTION

Field of the Invention

The present invention relates to information handling systems. More specifically, embodiments of the invention relate to optimizing complex SQL statements.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Structured query language (SQL) is a special-purpose programming language designed for managing data held in a relational database management system (RDBMS), or for stream processing in a relational data stream management system (RDSMS). It is known to execute structured query language (SQL) statements on information handling systems to access and interact with a database, the combination of which is generally referred to as a SQL system. SQL statements may be long and complex.

It is known to perform a SQL rewrite operation to improve performance of a SQL statement. The SQL rewrite operation is often performed by user such as an experienced database administrator either manually (often referred to as a human SQL statement rewrite operation) or via computer executing a SQL rewrite algorithm having some form of artificial intelligence or embedded human knowledge (often referred to as a machine SQL statement rewrite operation). With a human SQL statement rewrite, the user can make use of heuristic knowledge and an understanding of data to provide a SQL statement rewrite that is usually more focused on a particular region of the SQL statement as the user would likely have knowledge regarding where the problem originates. However, the human SQL statement rewrite operation process is often time intensive and can require precise changes and sometimes repeated attempts to generate a solution. With a machine SQL statement rewrite operation, the computer can be much more efficient and precise when generating multiple statement rewrites. However, the machine SQL statement rewrite operation has no heuristic knowledge and understanding of data. Accordingly, the machine SQL statement rewrite operation often requires significant time and resource to resolve a complex SQL statement within a large search space.

SUMMARY OF THE INVENTION

A system, method, and computer-readable medium are disclosed for optimizing complex SQL statements using a region divided preferential SQL rewrite operation. The region divided preferential SQL rewrite operation makes it possible for a user to inference a machine SQL statement rewrite operation to optimize the SQL statement with more or less focus on different regions of the SQL. This operation combines the strength of using heuristic knowledge and understanding of data to rewrite the region of the SQL statement where the problem originates with the precision and efficiency of a machine SQL statement rewrite operation. More specifically, optimizing a complex SQL statement includes a region division operation during which a SQL statement is divided into multiple regions, a user preference assignment process in which the user defines different attention level for different regions, and a region preferential rewrite operation in which the SQL statement is rewritten with consideration to the attention level defined for each region of the SQL statement.

In certain embodiments, the multiple regions of the complex SQL statement are defined by query blocks as well as by subqueries. Other embodiments may include different or other regions. Also, in certain embodiments, the regions can include abstract boundaries defining a smaller part of the SQL statement where the abstract boundaries are applicable to a certain type of rewrite, e.g. a FROM clause with a table list in which the users may want to change a join order.

Also, in certain embodiments, the different regions may identified by user intervention or may be automatically identified without the need of user intervention. When the regions are automatically identified, a user such as a database administrator can then specify one or multiple regions in the SQL statement and instruct the optimization operation to focus on these regions to rewrite during the optimization operation. By providing such an instruction, the optimization operation can be more efficiently executed. For example, the optimization operation can allocate more time on rewriting these regions or even extract these regions for another dedicated process to rewrite. The database administrator can also instruct the optimization operation to allocate different amounts of effort to be expended on optimizing different regions of the SQL statement.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2A shows an example SQL statement.

FIG. 2B shows an interim result of performing a region divided preferential SQL statement rewrite operation on an example SQL statement.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
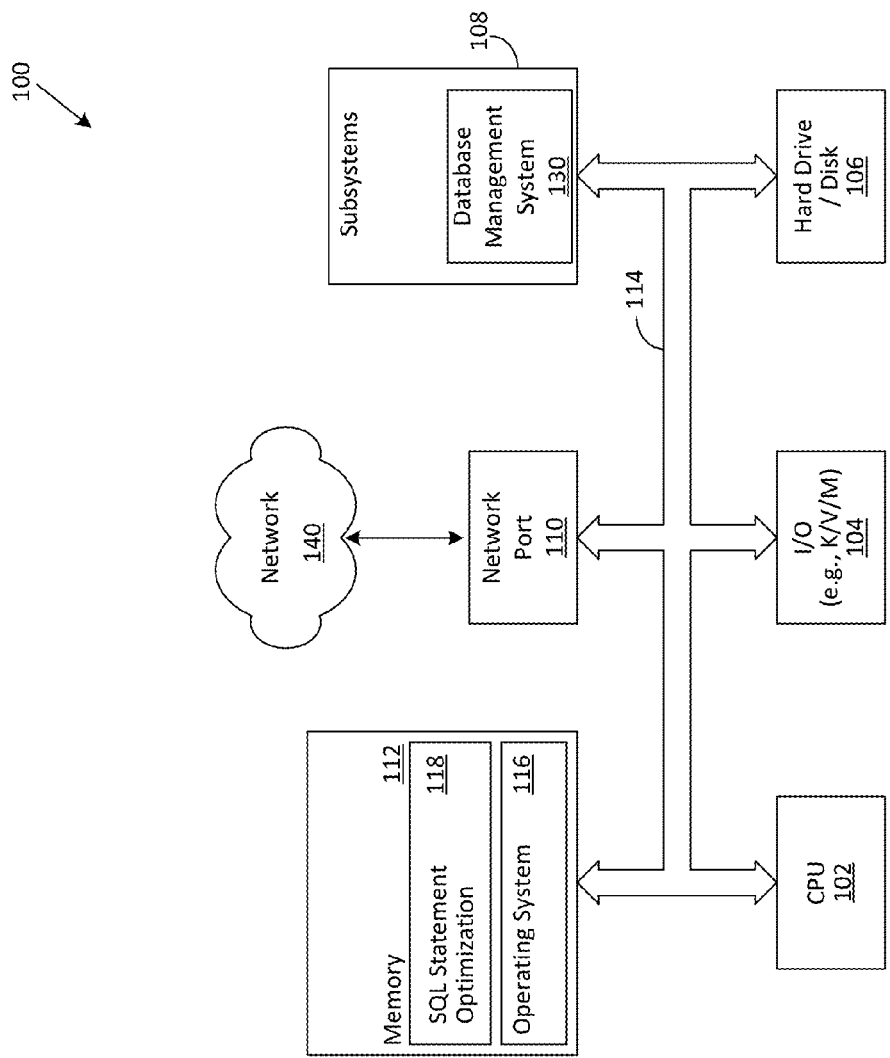
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server. The information handling system 100 likewise includes system memory 112, which is interconnected to the foregoing via one or more buses 114. System memory 112 further comprises operating system (OS) 116 and in various embodiments may also comprise a SQL statement optimization module 118 as well as a database management system 130.

The SQL statement optimization module 118 optimizes complex SQL statements by enabling combination of a region division SQL statement rewrite operation with a regions preferential rewrite operation to provide a region divided preferential SQL statement rewrite operation. In certain embodiments, a complex SQL statement may be defined as a SQL statement that accesses more than three tables; and which is composited with sub-query or different query blocks in the syntax of the SQL statement. Such a region divided preferential SQL statement rewrite operation combines the strength of the region division knowledge provided by users about one or multiple problematic regions of a SQL statement with the precision and efficiency of a regions preferential rewrite operation. More specifically, optimizing a complex SQL statement includes a region division operation during which a SQL statement is divided into multiple regions and a regions preferential optimization operation during which the SQL statement is optimized to focus on the regions in which the SQL statement is divided.

In certain embodiments, the multiple regions of the complex SQL statement are defined by query blocks as well as by subqueries. Other embodiments may include different or other regions. Also, in certain embodiments, the regions can include abstract boundaries defining a smaller part of the SQL statement where the abstract boundaries are applicable to a certain type of rewrite, e.g. a FROM clause with a table list in which the users may want to change a join order.

Also, in certain embodiments, the different regions may identified by user intervention or may be automatically identified without the need of user intervention. When the regions are automatically identified, a user such as a database administrator can then specify one or multiple regions in the SQL statement and instruct the optimization operation to focus on these regions to rewrite during the optimization operation. By providing such an instruction, the optimization operation can be more efficiently executed. For example, the optimization operation can allocate more time on rewriting these regions or even extract these regions for another dedicated process to rewrite. The database administrator can also instruct the optimization operation to allocate different amounts of effort to be expended on optimizing different regions of the SQL statement.

Referring to FIG. 2A, an example SQL statement is shown. The example SQL statement includes two main queries with their results being combined together by a UNION operator. Each query has multiple tables joined together to retrieve the corresponding data. The example SQL statement also includes sub-queries which are used as the criteria to filter the data. In the next level, the sub-queries also use other sub-queries to filter data.

FIG. 2B shows an interim result of performing a region divided preferential SQL statement rewrite operation on an example SQL statement where the regions are identified. More specifically, the interim result 210 identifies multiple regions of the SQL statement. In certain embodiments, these regions include by query blocks 250 as well as subqueries blocks 260, 262. In certain embodiments, the regions include differing presentations depending on the type of regions. For example, query blocks are represented differently than subquery blocks.

Figure 3:
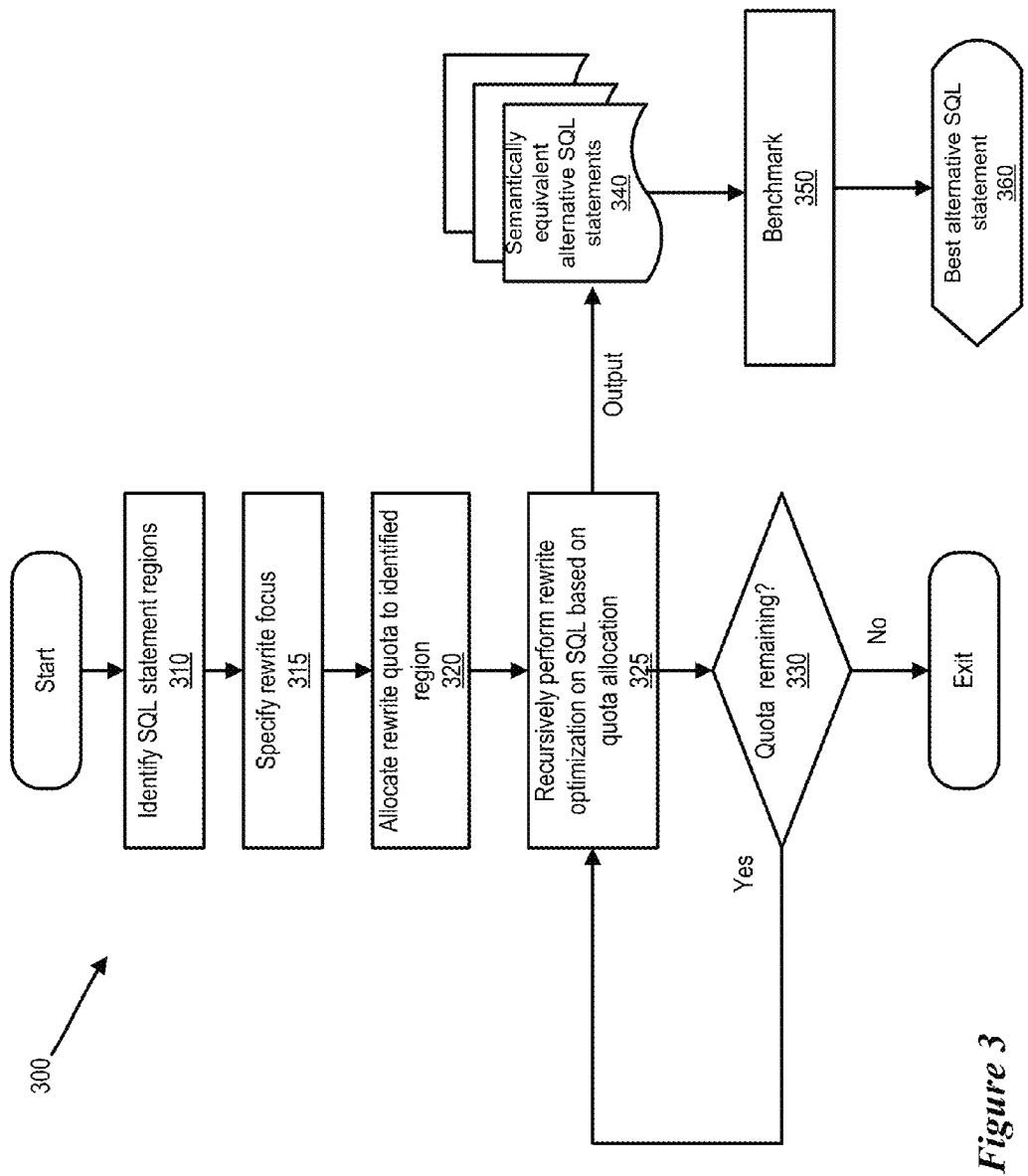
FIG. 3 shows a flow chart of the operation of a region divided preferential SQL statement rewrite operation

FIG. 3 shows a flow chart of the operation of a region divided preferential SQL statement rewrite system 300. More specifically, the operation begins at step 310 with the SQL statement optimization system 300 identifying one or more regions of interest within the SQL. In certain embodiments, a parsing operation is used to divide the SQL statement according to SQL syntax rules. Specific regions are identified, such as sub-queries. Additionally, various query blocks are divided and highlighted for ease of selection. Each identified region corresponds to a portion of the SQL statement which would benefit from a SQL statement rewrite. Next, at step 315, a rewrite focus is specified on each of the identified regions. The rewrite focus provides the SQL statement rewrite system 300 with an indication of a particular amount of resource to be expended on a particular region. In certain embodiments, the particular amount of resource may correspond to a percentage of an overall resource available for statement optimization. In other embodiments, the particular amount of resource may correspond to a predefined amount of resource (e.g., a predefined amount of time). In certain embodiments, the particular amount of resource may be evenly divided across a subset of the identified regions. In certain embodiments, the rewrite focus is a user-specified input provided via user interaction where the user would be able to inference how to machine rewrite the SQL statement.

Next, at step 320, the SQL statement optimization system 300 allocates a rewrite quota to the identified region or regions. Specifically, in certain embodiments, the regions which are specified by the user to be the focus of the rewrite operation are identified with higher quota values (i.e., to receive a higher portion of the rewrite resources) than the regions that are not the focus of the rewrite operation. In certain embodiments, the optimization operation includes an operation which allocates more rewrite quota for selected problematic regions. Next at step 325, the SQL statement optimization system 300 recursively performs a rewrite optimization operation on the SQL statement based upon the quota allocation. In certain embodiments, a rewrite engine rewrites the SQL statement based on a specific allocated quota. Additionally, in certain embodiments, the optimization operation the rewriting is more preferential to specified potentially problematic regions of the SQL Statement. Next at step 330, the SQL statement optimization system 300 determines whether any quotas remain. If so, then the SQL statement optimization system 300 performs a rewrite optimization operation based upon the quota allocation at step 320. If not, then the operation of the region divided preferential SQL statement rewrite system 300 completes.

As a result of the rewrite optimization performed at step 325, the SQL statement optimization system 300 provides semantically equivalent alternative SQL statements 340. These semantically equivalent alternative SQL statements 340 are compared against a performance benchmark at step 350. The performance benchmark compares the performance of each of the semantically equivalent alternative SQL statements as well as the performance of the original SQL statement. The best alternative SQL statement (or the original SQL statement if that has the best performance) is provided as the optimized SQL statement at step 360.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method, comprising:
performing a region division structured query language (SQL) statement rewrite operation on the SQL statement, the region division SQL statement rewrite operation identifying a plurality of SQL statement regions;
specifying a rewrite focus priority for a particular SQL statement region in the plurality of SQL statement regions, the rewrite focus priority providing an indication of a particular amount of resource to be expended on the particular SQL statement region during an optimization operation on the particular SQL statement region, the rewrite focus priority indicating that the optimization operation is to be performed on the particular SQL statement region before other SQLs statement region in the plurality of SQL statement regions;

performing a region preferential SQL statement optimization operation on the particular SQL statement region based on the rewrite focus priority indicating that the optimization operation is to be performed on the particular SQL statement region before other SQLs statement region in the plurality of SQL statement regions and based upon the indication of the particular amount of resource to be expended on the particular SQL statement region, the SQL statement optimization operation recursively performing a rewrite optimization on the particular SQL statement region according to the specified rewrite focus priority.

2. The method of claim 1, wherein:
the plurality of SQL statement regions of the SQL statement are defined by query blocks and subquery blocks.

3. The method of claim 1, wherein:
the plurality of SQL statement regions comprise boundaries defining a smaller portion of the SQL statement, the boundaries being applicable to a certain type of rewrite operation.

4. The method of claim 3, wherein:
the certain type of rewrite operation comprises a FROM clause with a table list in which a join order is changed.

5. The method of claim 1, wherein:
after the regions are identified, the method further comprises receiving an identification of a certain region in the SQL statement and instructing the optimization operation to focus on the certain regions to rewrite during the optimization operation.

6. The method of claim 1, wherein:
the specifying is provided via a user-specified input where the user is able to inference how to rewrite the SQL statement.

7. A system, comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor to cause the system to perform operations comprising:
perform a region division structured query language (SQL) statement rewrite operation on the SQL statement, the region division SQL statement rewrite operation identifying a plurality of SQL statement regions;
specify a rewrite focus priority for a particular SQL statement region in the plurality of SQL statement regions, the rewrite focus priority providing an indication of the particular amount of resource to be expended on a particular SQL statement region during an optimization operation on the particular SQL statement region, the rewrite focus priority indicating that the optimization operation is to be performed on the particular SQL statement region before other SQLs statement region in the plurality of SQL statement regions;
perform a region preferential SQL statement optimization operation on the particular SQL statement region based on the rewrite focus priority indicating that the optimization operation is to be performed on the particular SQL statement region before other SQLs statement region in the plurality of SQL statement regions and based upon the indication of the particular amount of resource to be expended on the particular SQL statement region, the SQL statement optimization operation recursively performing a rewrite optimization on the particular SQL statement region according to the specified rewrite focus priority.

8. The system of claim 7, wherein:
the plurality of SQL statement regions of the SQL statement are defined by query blocks and subquery blocks.

9. The system of claim 7, wherein:
the plurality of SQL statement regions comprise boundaries defining a smaller portion of the SQL statement, the boundaries being applicable to a certain type of rewrite operation.

10. The system of claim 7, wherein:
the certain type of rewrite operation comprises a FROM clause with a table list in which a join order is changed.

11. The system of claim 7, wherein:
after the regions are identified, the operations further comprise receiving an identification of a certain region in the SQL statement and instructing the optimization operation to focus on the certain regions to rewrite during the optimization operation.

12. The system of claim 7, wherein:
the specifying is provided via a user-specified input where the user is able to inference how to rewrite the SQL statement.

13. A non-transitory, computer-readable storage medium embodying computer program code, the computer program code comprising computer executable instructions that, when executed by a processor, cause a system to perform operations comprising:
performing a region division structured query language (SQL) statement rewrite operation on the SQL statement, the region division SQL statement rewrite operation identifying a plurality of SQL statement regions;
specifying a rewrite focus priority for a particular SQL statement region in the plurality of SQL statement regions, the rewrite focus priority providing an indication of a particular amount of resource to be expended on the particular SQL statement region during an optimization operation on the particular SQL statement region, the rewrite focus priority indicating that the optimization operation is to be performed on the particular SQL statement region before other SQLs statement region in the plurality of SQL statement regions;
performing a region preferential SQL statement optimization operation on the particular SQL statement region based on the rewrite focus priority indicating that the optimization operation is to be performed on the particular SQL statement region before other SQLs statement region in the plurality of SQL statement regions and based upon the indication of the particular amount of resource to be expended on the particular SQL statement region, the SQL statement optimization operation recursively performing a rewrite optimization on the particular SQL statement region according to the specified rewrite focus priority.

14. The non-transitory, computer-readable storage medium of claim 13, wherein:
the plurality of SQL statement regions of the SQL statement are defined by query blocks and subquery blocks.

15. The non-transitory, computer-readable storage medium of claim 13, wherein:
the plurality of SQL statement regions comprise boundaries defining a smaller portion of the SQL statement, the boundaries being applicable to a certain type of rewrite operation.

16. The non-transitory, computer-readable storage medium of claim 13, wherein:
the certain type of rewrite operation comprises a FROM clause with a table list in which a join order is changed.

17. The non-transitory, computer-readable storage medium of claim 13, wherein:
after the regions are identified, the operations further comprise receiving an identification of a certain region in the SQL statement and instructing the optimization operation to focus on the certain regions to rewrite during the optimization operation.

18. The non-transitory, computer-readable storage medium of claim 13, wherein:
the specifying is provided via a user-specified input where the user is able to inference how to rewrite the SQL statement.

* * * * *